US006884537B2

(12) United States Patent
Smith

(10) Patent No.: US 6,884,537 B2
(45) Date of Patent: Apr. 26, 2005

(54) STRUCTURAL SEAL FOR A FUEL CELL

(75) Inventor: Jeffrey Alan Smith, Brighton, MI (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 327 days.

(21) Appl. No.: 10/326,174

(22) Filed: Dec. 20, 2002

(65) Prior Publication Data

US 2003/0118889 A1 Jun. 26, 2003

Related U.S. Application Data

(60) Provisional application No. 60/344,323, filed on Dec. 20, 2001.

(51) Int. Cl.[7] ........................ H01M 2/08

(52) U.S. Cl. ........................ 429/36

(58) Field of Search ........................ 429/35, 36

(56) References Cited

U.S. PATENT DOCUMENTS 6,761,991 B1 * 7/2004 Frisch et al. .................. 429/35

* cited by examiner

*Primary Examiner*—Patrick Joseph Ryan
*Assistant Examiner*—Thomas H. Parsons
(74) *Attorney, Agent, or Firm*—Ronald W. Wangerow; Donald A. Wilkinson

(57) ABSTRACT

A fuel cell gasket employed to seal around an individual cell of a fuel cell assembly. The gaskets include sealing beads that are compressed against separator plates. Adhesive layers located between the gaskets and separator plates hold the gaskets against the separator plates and maintain a desired pre-load on the sealing beads. These structural seals provide good seals along the surfaces of the separator plates, thus reducing or eliminating the need for bolts to maintain the pre-load on the sealing beads of the gaskets.

20 Claims, 2 Drawing Sheets

20
38
34
80
2
2

STRUCTURAL SEAL FOR A FUEL CELL

CROSS REFERENCE TO RELATED APPLICATIONS

This claims the benefit of United States provisional patent application identified as application Ser. No. 60/344,323, filed Dec. 20, 2001.

BACKGROUND OF INVENTION

This invention relates in general to fluid seals, and more particularly to static gaskets for various encapsulating covers and especially fuel cells.

A fuel cell is an electrochemical energy converter that includes two electrodes placed on opposite surfaces of an electrolyte. In one form, an ion-conducting polymer electrolyte membrane is disposed between two electrode layers to form a membrane electrode assembly (MEA). The MEA is used to promote a desired electrochemical reaction from two reactants. One reactant, oxygen or air, passes over one electrode while hydrogen, the other reactant, passes over the other electrode. The oxygen and hydrogen combine to produce water, and in the process generate electricity and heat.

An individual cell within a fuel cell assembly includes a MEA placed between a pair of separator plates. The separator plates are typically fluid impermeable and electrically conductive. Fluid flow passages or channels are formed adjacent to each plate surface at an electrode layer to facilitate access of the reactants to the electrodes and the removal of the products of the chemical reaction. In such fuel cells, resilient gaskets or seals are typically provided between the faces of the MEA and the perimeter of each separator plate to prevent leakage of the fluid reactant and product streams. Since the fuel cell operates with oxygen and hydrogen, it is important to provide a seal that not only seals well against hydrogen, oxygen and water, but that will seal well as the temperature changes due to the heat that is given off during fuel cell operation. To assure a good seal, bolts or other clamping mechanisms are used to maintain a compression load between the separator plates. This adds to the number of components in the assembly as well as making the assembly process more time consuming.

Thus, it is desirable to have a fuel cell with components that are relatively easy to assemble, while assuring the proper sealing for the finished assembly. And, in particular, it is desirable to have a fuel cell where the individual cells employ a minimum number of parts to assemble, while maintaining the proper compression load on the seal to assure the desired sealing characteristics for each individual cell.

SUMMARY OF INVENTION

In its embodiments, the present invention contemplates an apparatus for use in a fuel cell. The apparatus includes a membrane electrode assembly, and a first gasket, formed of an elastomeric material, having a first surface and a second surface, with the first surface secured to the membrane electrode assembly, and with the first gasket including a first sealing bead protruding from the second surface. A first separator plate is mounted to the first gasket in compressing engagement with the first sealing bead, and a first layer of adhesive is located between the first gasket and the first separator plate such that the first separator plate is maintained in compressing engagement with the first sealing bead.

The present invention further contemplates a method of forming an individual cell adapted for use in a fuel cell, the method comprising the steps of: assembling a membrane electrode assembly having a first gas diffusion layer and a second gas diffusion layer; securing a first gasket to the first gas diffusion layer on a first surface of the first gasket; providing a first sealing bead protruding from a second surface of the first gasket; coating the second surface of the first gasket with a first layer of adhesive; mounting a first separator plate against the first sealing bead; applying a pressure against the first separator plate to thereby compress the first sealing bead; and maintaining the pressure against the first separator plate until the first layer of adhesive has cured.

An advantage of the present invention is that it reduces the number of potential leak paths.

Another advantage of the present invention is that it reduces or eliminates the need for forming bolt holes to hold the assembly together, and further eliminates concerns of bolts relaxing over time, causing a reduction in the seal loading.

A further advantage of the present invention is that the individual cell is less complex and allows for a less expensive assembly.

DETAILED DESCRIPTION

Figure 1:
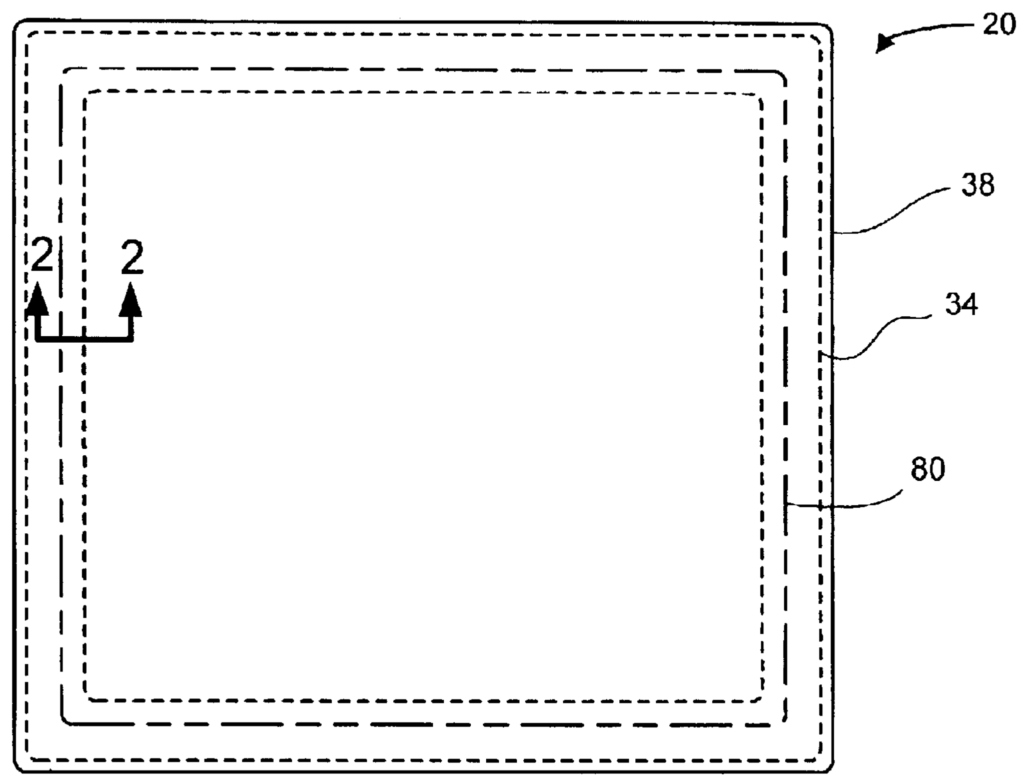
FIG. 1 is a schematic plan view of an individual cell according to this invention.
Figure 2:
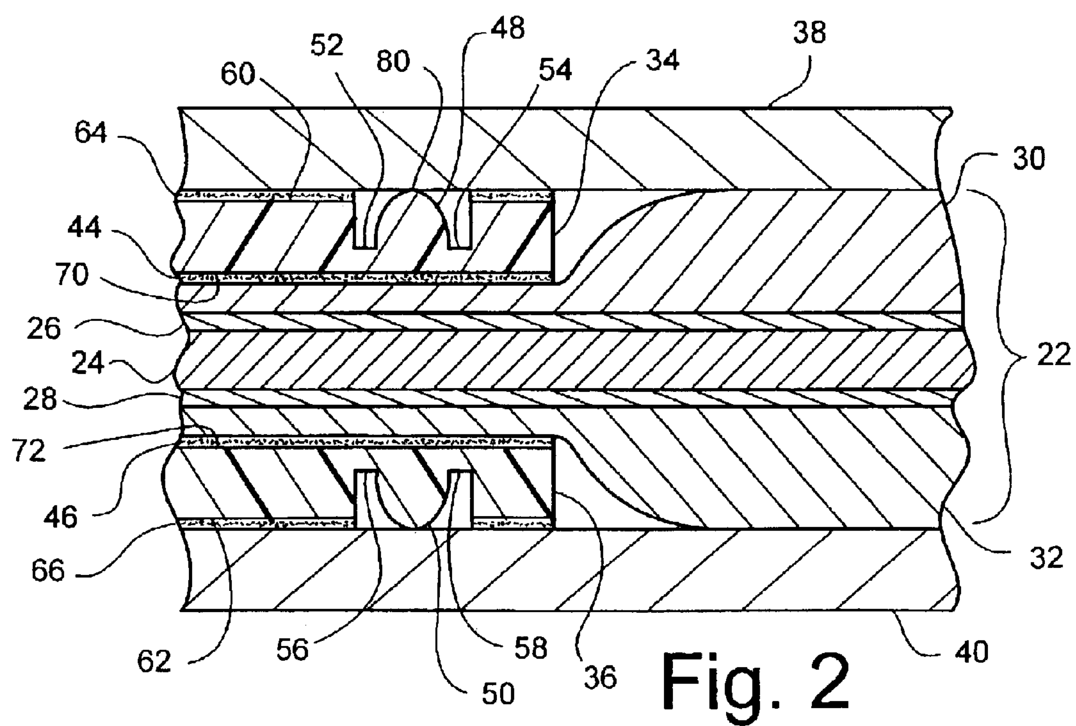
FIG. 2 is a section cut, on an enlarged scale, taken along line 2—2 in FIG. 1.

FIGS. 1–2 illustrate an individual cell 20 for use in a fuel cell assembly. The individual cell 20 includes a membrane electrode assembly (MEA) 22. The MEA 22 is made up of a membrane 24, with a first layer of catalyst material 26 a second layer of catalyst material 28 on either side of the membrane 24, and a first gas diffusion layer (GDL) 30 and second GDL 32 on either side of the layers of catalyst material 26, 28, respectively. The individual cell 20 also includes a first gasket 34 and a second gasket 36, secured around the perimeter of the first GDL 30 and the second GDL 32, respectively. Preferably, the gaskets 34, 36 are secured to the GDLs 30, 32 by layers of adhesive 44, 46, although other means of securing may be used if so desired. A first separator plate 38 mounts against the first gasket 34 and the first GDL 30, and a second separator plate 40 mounts against the second gasket 36 and the second GDL 32, in order to form a cell 20.

The membrane 24 is preferably an ion-conducting, polymer, electrolyte membrane, as generally employed in this type of fuel cell application. The first and second layers of catalyst material 26, 28 are preferably platinum or other suitable catalyst material for a typical polymer electrode membrane type of fuel cell application. The first and second GDLs 30, 32 are preferably a carbonized fiber, or may be another suitable gas permeable material for use as an electrode in a fuel cell. The MEA 22 can include a catalyzed membrane with GDLs assembled thereto, or a membrane assembled between two catalyzed GDLs, each of which is known to those skilled in the art. The first and second separator plates 38, 40 are generally rectangular in shape, although other shapes can also be employed if so desired. The plates 38, 40 have outer surfaces that are made to mate with adjoining individual cells in making up a completed fuel cell assembly. These fuel cell components are generally known to those skilled in the art.

Figure 3:
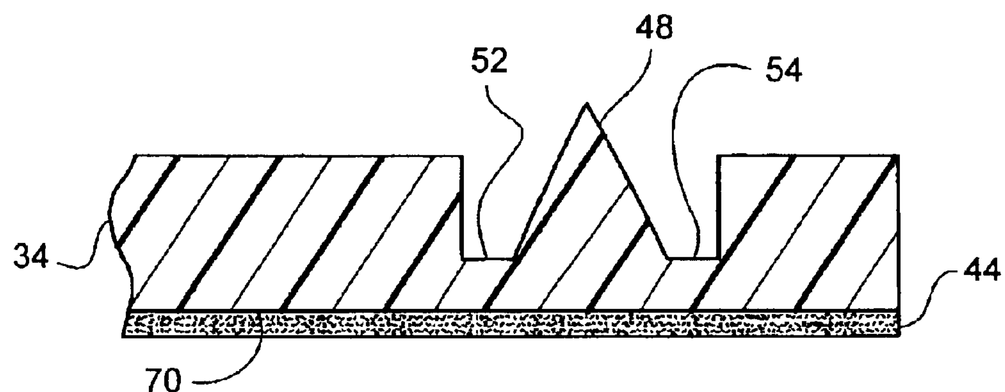
FIG. 3 is an enlarged, partial, sectional view of the gasket of FIG. 2 after an adhesive has been applied but before assembly to a MEA or separator plates, according to this invention.
Figure 4:
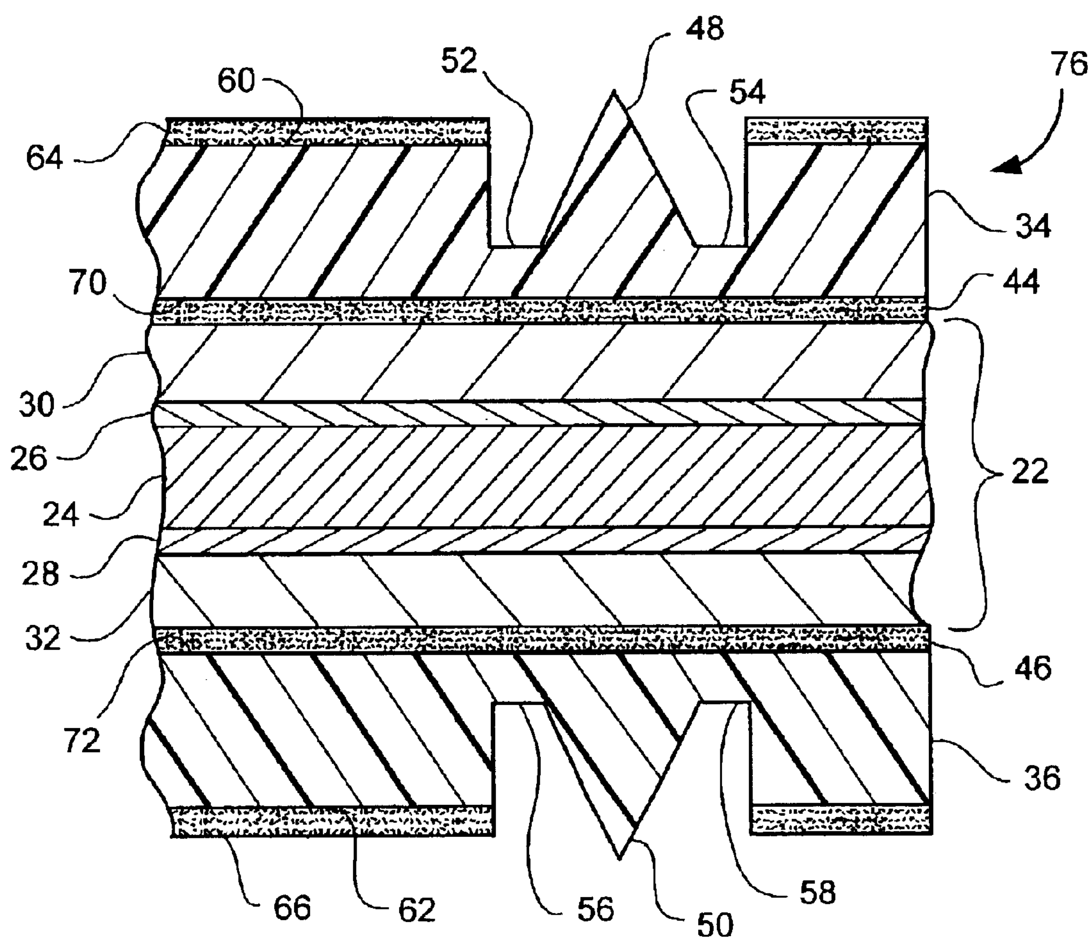
FIG. 4 is an enlarged, partial, sectional view of a MEA assembled to a pair of gaskets, according to this invention.

FIGS. 1–4 illustrate the individual cell 20, as well as portions of the cell 20 as it is being assembled. The gaskets 34, 36 are preferably an elastomeric material, such as, for example, rubber. Each gasket 34, 36 includes a sealing bead 48, 50, which extends around substantially the entire perimeter of the cell 20 in order to accomplish its sealing function. A first set of channels 52, 54 are formed adjacent the first bead 48 and a second set of channels 56, 58 are formed adjacent the second bead 50. Each bead 48, 50 in its uncompressed state, as shown in FIGS. 3 and 4, is generally triangular in cross section—although other suitable shapes as are typically employed for sealing beads in gaskets can be employed instead. In the initial uncompressed state, the height of the sealing beads 48, 50 is selected so that they project beyond the outer surfaces 60, 62 of the gaskets 34, 36 and adhesive layers 64, 66.

In a method of assembly, the layer of adhesive 44 is applied to an inner surface 70 of the first gasket 34, as is illustrated in FIG. 3. Then, the first gasket 34 is assembled to the MEA 22, which has already been assembled by means known to those skilled in the art, and the layer of adhesive 64 is applied to the outer surface 60, as is illustrated in FIG. 4. The same process is also accomplished for the second gasket 36, with layers of adhesive 46, 66 placed on the inner surface 72 and outer surface 62, respectively—thus forming a cell subassembly 76. As mentioned above, the adhesive is preferably a pressure sensitive adhesive that is screen printed onto the gaskets 34, 36, although other suitable types of adhesive may also be employed. The first separator plate 38 and second separator plate 40 are then assembled to the cell subassembly 76, and compressed with a predetermined amount of pressure until the adhesive has cured—thus forming the individual cell 20, as shown in FIGS. 1 and 2. Of course, as an alternative, the adhesive layers 44, 46 may be instead first applied to the GDLs 30, 32, and/or the adhesive layers 64, 66 first applied to the separator plates 38, 40 during the assembly of the various components.

Each bead 48, 50 extends beyond where the adjacent adhesive layer is so that it will be compressed during the assembly to its respective separator plate 38, 40 and remain in a compressed state after assembly is completed along a bead contact line 80, thus forming a structural seal. The compression of the beads is controlled by the adhesive layers 64, 66. This assures an appropriate pre-load on the seal beads 48, 50 will be maintained along the contact line 80 in order to have a good seal. The sealing beads 48, 50 prevent gases from leaking out along the surfaces of the separator plates 38, 40.

These adhesive layers 64, 66 reduce or eliminate the need for mechanical fasteners or other clamping devices to retain the plates 38, 40 to their respective gaskets 34, 36, while also maintaining the appropriate compression of the beads 48, 50 needed to assure a good seal. Consequently, the assembly process is less complex and the individual cell less expensive to manufacture.

While certain embodiments of the present invention have been described in detail, those familiar with the art to which this invention relates will recognize various alternative designs and embodiments for practicing the invention as defined by the following claims.

What is claimed is:

1. An apparatus for use in a fuel cell comprising:

a membrane electrode assembly;

a first gasket, formed of an elastomeric material, having a first surface and a second surface, with the first surface secured to the membrane electrode assembly, and with the first gasket including a first sealing bead protruding from the second surface;

a first separator plate mounted to the first gasket in compressing engagement with the first sealing bead; and a first layer of adhesive located between the first gasket and the first separator plate such that the first separator plate is maintained in compressing engagement with the first sealing bead.

2. The apparatus of claim 1 further including a second gasket, formed of an elastomeric material, having a third surface and a fourth surface, with the third surface secured to the membrane electrode assembly opposite the first gasket, and with the second gasket including a second sealing bead protruding from the fourth surface; a second separator plate mounted to the second gasket in compressing engagement with the second sealing bead; and a second layer of adhesive located between the second gasket and the second separator plate such that the second separator plate is maintained in compressing engagement with the second sealing bead.

3. The apparatus of claim 2 wherein the second layer of adhesive is a pressure sensitive adhesive.

4. The apparatus of claim 2 wherein the second gasket is formed of rubber.

5. The apparatus of claim 1 wherein the first layer of adhesive is a pressure sensitive adhesive.

6. The apparatus of claim 1 wherein the first gasket is formed of rubber.

7. The apparatus of claim 1 wherein the first gasket is secured to the membrane electrode assembly with a layer of adhesive.

8. The apparatus of claim 1 wherein the first sealing bead is formed generally in a triangular shape prior to mounting against the first separator plate.

9. The apparatus of claim 8 further including a pair of channels located adjacent the first bead and recessed into the second surface of the first gasket.

10. An individual cell adapted for use in a fuel cell assembly comprising:

a membrane electrode assembly;

a first gasket, formed of an elastomeric material, having a first surface and a second surface, with the first surface secured to the membrane electrode assembly, and with the first gasket including a first sealing bead protruding from the second surface;

a first separator plate mounted to the first gasket in compressing engagement with the first sealing bead;

a first layer of adhesive located between the first gasket and the first separator plate such that the first separator plate is maintained in compressing engagement with the first sealing bead;

a second gasket, formed of an elastomeric material, having a third surface and a fourth surface, with the third surface secured to the membrane electrode assembly opposite the first gasket, and with the second gasket including a second sealing bead protruding from the fourth surface;

a second separator plate mounted to the second gasket in compressing engagement with the second sealing bead; and a second layer of adhesive located between the second gasket and the second separator plate such that the second separator plate is maintained in compressing engagement with the second sealing bead.

11. The individual cell of claim 10 wherein the first gasket and the second gasket are formed of rubber.

12. The individual cell of claim 10 wherein the first layer of adhesive and the second layer of adhesive are a pressure sensitive adhesive.

13. The individual cell of claim 10 wherein the first gasket and the second gasket are secured to the membrane electrode assembly with a adhesive.

14. The individual cell of claim 10 wherein the membrane electrode assembly includes a membrane having a first layer of catalyst material and a second layer of catalyst material mounted on opposite sides thereof, and a first gas diffusion layer located adjacent to the first layer of catalyst material and a second gas diffusion layer located adjacent to the second layer of catalyst material.

15. A method of forming an individual cell adapted for use in a fuel cell, the method comprising the steps of:

assembling a membrane electrode assembly having a first gas diffusion layer and a second gas diffusion layer;

securing a first gasket to the first gas diffusion layer on a first surface of the first gasket;

providing a first sealing bead protruding from a second surface of the first gasket;

coating the second surface of the first gasket with a first layer of adhesive;

mounting a first separator plate against the first sealing bead;

applying a pressure against the first separator plate to thereby compress the first sealing bead; and maintaining the pressure against the first separator plate until the first layer of adhesive has cured.

16. The method of claim 15 further including the steps of: securing a second gasket to the second gas diffusion layer on a first surface of the second gasket; providing a second sealing bead protruding from a second surface of the second gasket; coating the second surface of the second gasket with a second layer of adhesive; mounting a second separator plate against the second sealing bead; applying a pressure against the second separator plate to thereby compress the second sealing bead; and maintaining the pressure against the second separator plate until the second layer of adhesive has cured.

17. The method of claim 16 wherein the step of securing a second gasket to the second gas diffusion layer is further defined by applying an adhesive between the second gasket and the second gas diffusion layer.

18. The method of claim 16 further including the step of forming the second gasket of rubber material.

19. The method of claim 15 wherein the step of securing a first gasket to the first gas diffusion layer is further defined by applying an adhesive between the first gasket and the first gas diffusion layer.

20. The method of claim 15 further including the step of forming the second gasket of rubber material.

* * * * *